United States Patent
Li

(10) Patent No.: US 9,438,903 B2
(45) Date of Patent: Sep. 6, 2016

(54) ENCODING METHOD AND APPARATUS FOR REDUCING DYNAMIC POWER CONSUMPTION DURING VIDEO ENCODING

(71) Applicant: Huawei Technologies Co., Ltd., Shenzhen (CN)

(72) Inventor: Ming Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 475 days.

(21) Appl. No.: 13/905,370

(22) Filed: May 30, 2013

(65) Prior Publication Data
US 2013/0322539 A1 Dec. 5, 2013

(30) Foreign Application Priority Data
May 30, 2012 (CN) .......................... 2012 1 0172553

(51) Int. Cl.
| | |
|---|---|
| H04N 7/12 | (2006.01) |
| H04N 19/42 | (2014.01) |
| H04N 19/105 | (2014.01) |
| H04N 19/139 | (2014.01) |
| H04N 19/176 | (2014.01) |
| H04N 19/523 | (2014.01) |
| H04N 19/107 | (2014.01) |

(52) U.S. Cl.
CPC ...... *H04N 19/00478* (2013.01); *H04N 19/105* (2014.11); *H04N 19/139* (2014.11); *H04N 19/176* (2014.11); *H04N 19/523* (2014.11); *H04N 19/107* (2014.11)

(58) Field of Classification Search
CPC .................... H04N 19/00478; H04N 19/105; H04N 19/107; H04N 19/139; H04N 19/176; H04N 19/523
USPC ........................ 375/240.12–240.16
See application file for complete search history.

(56) References Cited

U.S. PATENT DOCUMENTS

| | | | | |
|---|---|---|---|---|
| 2003/0072374 | A1* | 4/2003 | Sohm ..................... | G06T 7/202 375/240.16 |
| 2003/0202594 | A1* | 10/2003 | Lainema .............. | H04N 19/176 375/240.16 |
| 2004/0114817 | A1* | 6/2004 | Jayant ................... | H04N 19/00 382/239 |
| 2005/0105615 | A1* | 5/2005 | El-Maleh ............. | H04N 19/139 375/240.12 |

(Continued)

FOREIGN PATENT DOCUMENTS

| | | |
|---|---|---|
| CN | 101378504 A | 3/2009 |
| CN | 101583036 A | 11/2009 |

(Continued)

*Primary Examiner* — Jessica M Prince
(74) *Attorney, Agent, or Firm* — Brinks Gilson & Lione

(57) ABSTRACT

An embodiment of the present invention discloses an encoding method, including: collecting characteristic information of a macroblock, where the characteristic information is generated during encoding and includes a motion vector, inter-frame complexity, and intra-frame complexity of the macroblock that has undergone integer pixel motion estimation; determining a motion type of the macroblock according to the motion vector of the macroblock that has undergone the integer pixel motion estimation and a motion vector of an adjacent block adjacent to the macroblock; and enabling or disabling, according to the motion type of the macroblock, a part of work processes that are performed during the encoding.

10 Claims, 3 Drawing Sheets

(56) References Cited

U.S. PATENT DOCUMENTS

| | | | |
|---|---|---|---|
| 2009/0135901 A1* | 5/2009 | Au | H04N 19/147 375/240.02 |
| 2011/0228852 A1 | 9/2011 | Budagavi | |
| 2012/0269258 A1* | 10/2012 | Yang | H04N 19/00163 375/240.02 |
| 2013/0003849 A1* | 1/2013 | Chien | H04N 19/13 375/240.16 |
| 2013/0336407 A1* | 12/2013 | Chen | H04N 19/597 375/240.16 |

FOREIGN PATENT DOCUMENTS

| | | |
|---|---|---|
| CN | 101795409 A | 8/2010 |
| CN | 101835047 A | 9/2010 |
| CN | 102196255 A | 9/2011 |

* cited by examiner

ENCODING METHOD AND APPARATUS FOR REDUCING DYNAMIC POWER CONSUMPTION DURING VIDEO ENCODING

CROSS-REFERENCE TO RELATED APPLICATION

This application claims priority to Chinese Patent Application No. 201210172553.6, filed on May 30, 2012, which is hereby incorporated by reference in its entirety.

FIELD OF THE INVENTION

The present invention relates to the field of video encoding, and in particular to an encoding method and apparatus.

BACKGROUND OF THE INVENTION

A low-consumption design is a big challenge for a video encoder. After analysis, motion estimation, fractional pixel interpolation, intra-frame prediction, transform quantization, and loop filtering are main factors affecting power consumption of the encoder.

In the prior art, a manner of disabling some encoding tools such as a fast intra-frame prediction technology is generally used to reduce power consumption. Image texture information is analyzed to select whether to disable the intra-frame prediction or disable some predication modes. If regions with flat textures are detected, a prediction mode with a relatively large block is adopted for these regions, such as 16×16 intra-frame prediction in H.264, whereas 4×4 intra-frame prediction is disabled. On the contrary, if regions with complex textures are detected, a prediction mode with a relatively small block is adopted, such as the 4×4 intra-frame prediction in H.264, whereas the 16×16 intra-frame prediction is disabled. Such a method may significantly reduce types of prediction modes, thereby reducing power consumption. However, an additional circuit needs to be added to determine a degree of complexity of a texture. As a result, the design is relatively complicated. In addition, the added circuit may also increase power consumption. Further, after analysis, it can be learned that fractional pixel motion estimation requires a large amount of filtering logic. Therefore, disabling a fractional pixel filter module in video encoding may also achieve the effect of significantly reducing dynamic power consumption of the encoder. However, disabling the fractional pixel motion estimation and using only integer pixel motion estimation may bring about a decline in compression efficiency. This impact is particularly obvious in a case of complex motion of a large range.

SUMMARY OF THE INVENTION

A technical issue to be addressed in embodiments of the present invention is providing an encoding method and apparatus, which are capable of significantly reducing dynamic power consumption during video encoding on the premise that encoding compression efficient is ensured.

To address the technical issue, an embodiment of the present invention provides an encoding method, including:

collecting characteristic information of a macroblock, where the characteristic information is generated during encoding and includes a motion vector, inter-frame complexity, and intra-frame complexity of the macroblock that has undergone integer pixel motion estimation;

determining a motion type of the macroblock according to the motion vector of the macroblock that has undergone the integer pixel motion estimation and motion vectors of adjacent blocks adjacent to the macroblock; and enabling or disabling, according to the motion type of the macroblock, a part of work processes that are performed during the encoding.

The adjacent blocks include a left adjacent block, an upper adjacent block, an upper left adjacent block, and an upper right adjacent block.

The motion type of the macroblock includes motionlessness, true motion, and strictly true motion.

The step of determining a motion type of the macroblock according to the motion vector of the macroblock that has undergone the integer pixel motion estimation and motion vectors of adjacent blocks adjacent to the macroblock includes:

calculating values of $\max(|mvx-mvx_n|)$ and $\max(|mvy-mvy_n|)$, where (mvx, mvy) is the motion vector of the macroblock that has undergone the integer pixel motion estimation, and $(mvx_n, mvy_n)$ is a motion vector of an adjacent block adjacent to the macroblock;

determining whether motion vector values mvx and mvy of the macroblock both are equal to 0 and whether the inter-frame complexity of the macroblock is less than a first threshold, where if yes, the motion type of the macroblock is motionlessness;

determining whether the values of $\max(|mvx-mvx_n|)$ and $\max(|mvy-mvy_n|)$ are both less than a second threshold, where if yes, the motion type of the macroblock is strictly true motion; and determining whether the values of $\max(|mvx-mvx_n|)$ and $\max(|mvy-mvy_n|)$ are both less than a third threshold, where if yes, the motion type of the macroblock is true motion, and the second threshold is less than the third threshold.

The step of enabling or disabling, according to the motion type of the macroblock, a part of work processes that are performed during the encoding includes:

determining whether the motion type of the macroblock is motionlessness or true motion; and if yes, disabling intra-frame prediction for the macroblock.

The step of enabling or disabling, according to the motion type of the macroblock, a part of work processes that are performed during the encoding further includes:

determining whether the motion type of the macroblock is motionlessness or strictly true motion and whether the intra-frame complexity of the macroblock is less than a fourth threshold; and if yes, disabling fractional pixel motion estimation for the macroblock on the basis of disabling the intra-frame prediction for the macroblock.

A switch mode for enabling or disabling, according to the motion type of the macroblock, a part of work processes that are performed during the encoding is a self-adaptive switch mode.

Accordingly, an embodiment of the present invention further provides an encoding apparatus, including:

a collection module, configured to collect characteristic information of a macroblock, where the characteristic information is generated during encoding and includes a motion vector, inter-frame complexity, and intra-frame complexity of the macroblock that has undergone integer pixel motion estimation;

a determining module, configured to determine a motion type of the macroblock according to the motion vector of the macroblock that has undergone the integer pixel motion estimation and motion vectors of adjacent blocks adjacent to the macroblock; and a switch module, configured to enable or disable, according to the motion type of the macroblock, a part of work processes that are performed during the encoding.

The adjacent blocks include a left adjacent block, an upper adjacent block, an upper left adjacent block, and an upper right adjacent block.

The determining module is further configured to:

calculate values of $\max(|mvx-mvx_n|)$ and $\max(|mvy-mvy_n|)$, where (mvx, mvy) is the motion vector of the macroblock that has undergone the integer pixel motion estimation, and $(mvx_n, mvy_n)$ is a motion vector of an adjacent block adjacent to the macroblock;

determine whether motion vector values mvx and mvy of the macroblock both are equal to 0 and whether the inter-frame complexity of the macroblock is less than a first threshold, where if yes, the motion type of the macroblock is motionlessness;

determine whether the values of $\max(|mvx-mvx_n|)$ and $\max(|mvy-mvy_n|)$ are both less than a second threshold, where if yes, the motion type of the macroblock is strictly true motion; and determine whether the values of $\max(|mvx-mvx_n|)$ and $\max(|mvy-mvy_n|)$ are both less than a third threshold, where if yes, the motion type of the macroblock is true motion, and the second threshold is less than the third threshold.

The switch module is further configured to:

determine whether the motion type of the macroblock is motionlessness or true motion, and if yes, disable intra-frame prediction for the macroblock; and determine whether the motion type of the macroblock is motionlessness or strictly true motion and whether the intra-frame complexity of the macroblock is less than a fourth threshold, and if yes, disable fractional pixel motion estimation for the macroblock on the basis of disabling the intra-frame prediction for the macroblock.

A switch mode of the switch module is a self-adaptive switch mode.

Implementation of the embodiments of the present invention brings the following beneficial effects:

Dynamic power consumption during video encoding can be significantly reduced, on the premise that encoding compression efficiency is ensured, simply by calculating and analyzing characteristic information of a macroblock, where the characteristic information is generated during the encoding, and enabling or disabling, in self-adaptive mode according to a calculation result, intra-frame prediction and fractional pixel motion estimation that are performed during the encoding, thereby achieving an effect of green energy saving. A switch mode for enabling or disabling the intra-frame prediction and the fractional pixel motion estimation is a self-adaptive switch mode. In this way, no manual operation is required and convenient use is achieved.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following descriptions show merely some embodiments of the present invention, and persons of ordinary skill in the art may still derive other drawings from these accompanying drawings without creative efforts.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
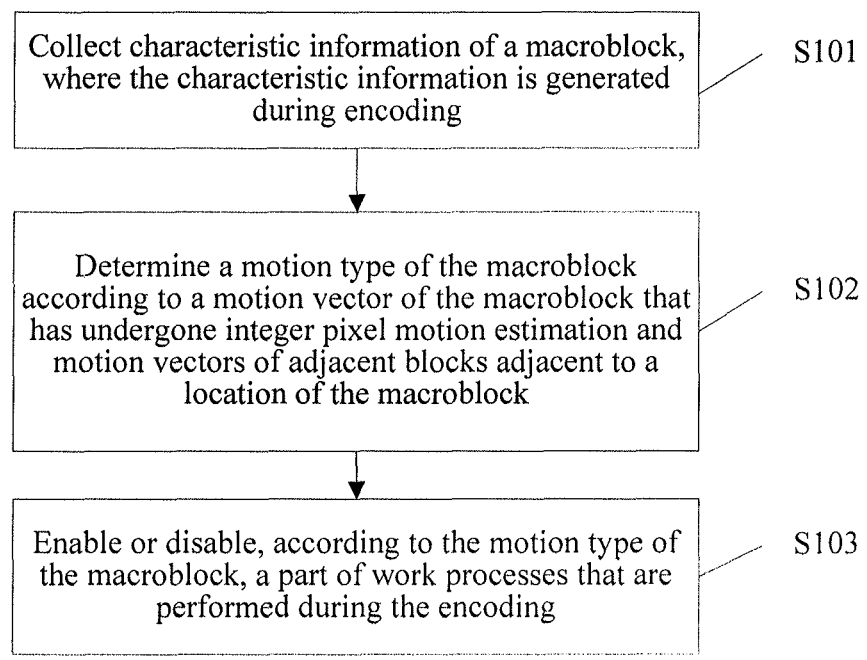
FIG. 1 is a schematic flowchart of a first embodiment of an encoding method according to the present invention.

Refer to FIG. 1, which is a schematic flowchart of a first embodiment of an encoding method according to the present invention. The encoding method in this embodiment includes the following steps:

S101. Collect characteristic information of a macroblock, where the characteristic information is generated during encoding.

The characteristic information includes a motion vector of the macroblock in integer pixel motion, inter-frame complexity of the macroblock, and intra-frame complexity of the macroblock.

Specifically, the inter-frame complexity is the sum of absolute differences between the macroblock and a reference block at an optimum-matching position of a preceding frame, and the intra-frame complexity is the sum of absolute residuals between each pixel of the macroblock and an average of brightness values of the macroblock.

S102. Determine a motion type of the macroblock according to the motion vector of the macroblock that has undergone the integer pixel motion estimation and motion vectors of adjacent blocks adjacent to the macroblock.

Specifically, the adjacent blocks include a left adjacent block, an upper adjacent block, an upper left adjacent block, and an upper right adjacent block. The motion type includes motionlessness, true motion, and strictly true motion. A specific step of determining the motion type of the macroblock includes: calculating values of $\max(|mvx-mvx_n|)$ and $\max(|mvy-mvy_n|)$, where (mvx, mvy) is the motion vector of the macroblock that has undergone the integer pixel motion estimation, and $(mvx_n, mvy_n)$ is a motion vector of an adjacent block adjacent to the macroblock. When motion vector values mvx and mvy of the macroblock both are equal to 0 and the inter-frame complexity of the macroblock is less than a first threshold, the motion type of the macroblock is motionlessness; when the values of $\max(|mvx-mvx_n|)$ and $\max(|mvy-mvy_n|)$ are both less than a second threshold, the motion type of the macroblock is strictly true motion; and when the values of $\max(|mvx-mvx_n|)$ and $\max(|mvy-mvy_n|)$ are both less than a third threshold, the motion type of the macroblock is true motion, where the second threshold is less than the third threshold.

S103. Enable or disable, according to the motion type of the macroblock, a part of work processes that are performed during the encoding.

A switch mode for enabling or disabling, according to the motion type of the macroblock, a part of work processes that are performed during the encoding is a self-adaptive switch mode. In this way, no manual operation is required and convenient use is achieved.

In this embodiment, characteristic information of a macroblock is calculated and analyzed, where the characteristic information is generated during encoding. In addition, a part of work processes that are performed during the encoding are enabled and disabled in self-adaptive mode according to a calculation result and the characteristic information. This may significantly reduce dynamic power consumption during video encoding on the premise that encoding compression efficiency is ensured.

Figure 2:
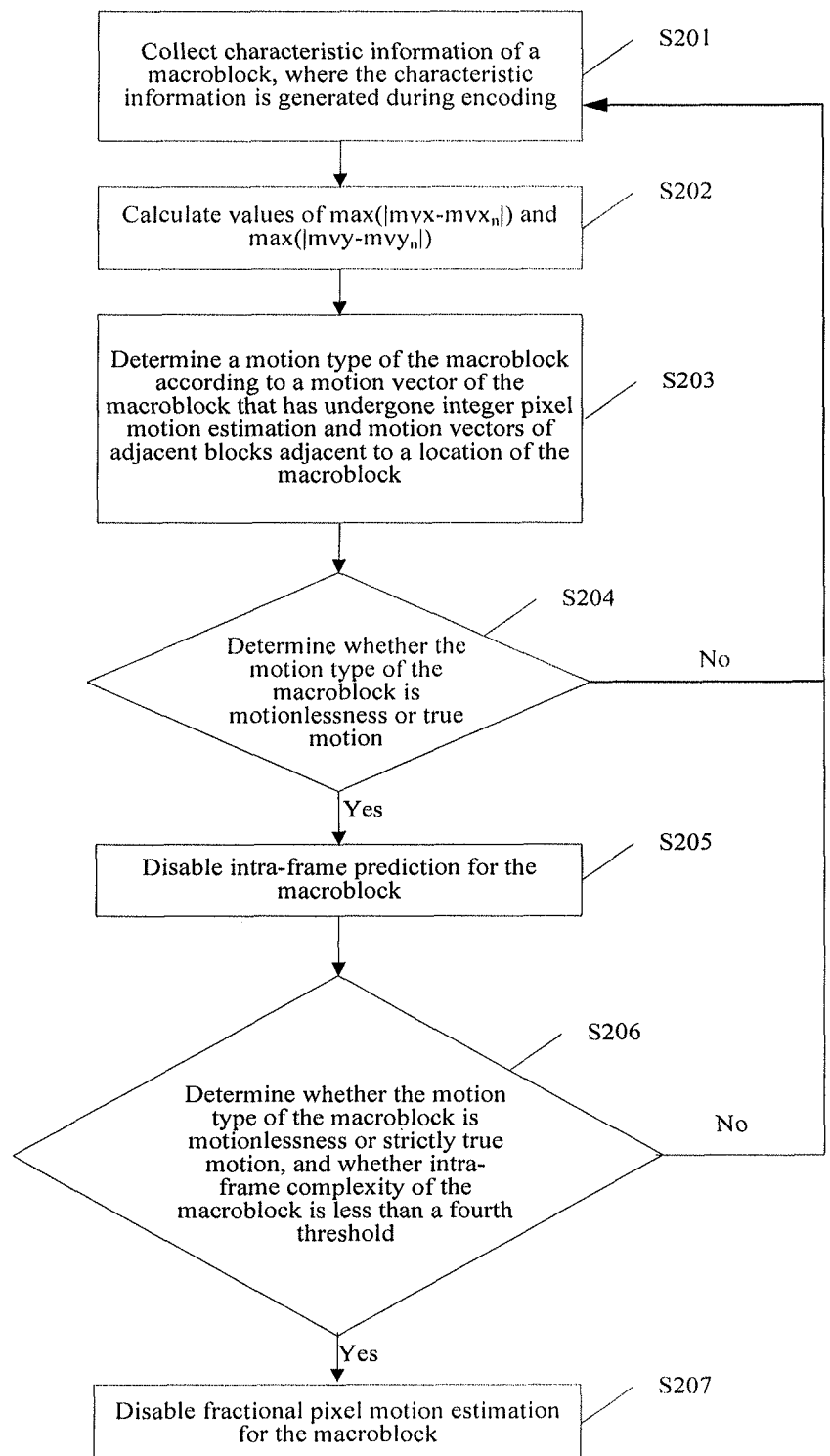
FIG. 2 is a schematic flowchart of a second embodiment of an encoding method according to the present invention.

FIG. 2 is a schematic flowchart of a second embodiment of an encoding method according to the present invention. The encoding method in this embodiment includes the following steps:

S201. Collect characteristic information of a macroblock, where the characteristic information is generated during encoding.

The characteristic information includes a motion vector of the macroblock in integer pixel motion, inter-frame complexity of the macroblock, and intra-frame complexity of the macroblock.

Specifically, the inter-frame complexity is the sum of absolute differences between the macroblock and a reference block at an optimum-matching position of a preceding frame, and the intra-frame complexity is the sum of absolute residuals between each pixel of the macroblock and an average of brightness values of the macroblock.

S202. Calculate values of $\max(|mvx-mvx_n|)$ and $\max(|mvy-mvy_n|)$, where (mvx, mvy) is the motion vector of the macroblock that has undergone the integer pixel motion estimation, and $(mvx_n, mvy_n)$ is a motion vector of an adjacent block adjacent to the macroblock.

Specifically, the adjacent blocks include a left adjacent block, an upper adjacent block, an upper left adjacent block, and an upper right adjacent block.

S203. Determine a motion type of the macroblock according to the values obtained by performing the calculation and the characteristic information of the macroblock.

The motion type of the macroblock includes motionlessness, true motion, and strictly true motion. When motion vector values mvx and mvy of the macroblock both are equal to 0 and the inter-frame complexity of the macroblock is less than a first threshold, the motion type of the macroblock is motionlessness; when the values of $\max(|mvx-mvx_n|)$ and $\max(|mvy-mvy_n|)$ are both less than a second threshold, the motion type of the macroblock is strictly true motion; and when the values of $\max(|mvx-mvx_n|)$ and $\max(|mvy-mvy_n|)$ are both less than a third threshold, the motion type of the macroblock is true motion, where the second threshold is less than the third threshold.

S204. Determine whether the motion type of the macroblock is motionlessness or true motion. If yes, perform step S205; otherwise, return to step S201, that is, disable no work process and continue to collect characteristic information generated during the encoding.

S205. Disable intra-frame prediction for the macroblock.

S206. Determine whether the motion type of the macroblock is motionlessness or strictly true motion and whether the intra-frame complexity of the macroblock is less than a fourth threshold. If yes, disable fractional pixel motion estimation for the macroblock; otherwise, return to step S201, that is, continue to collect characteristic information generated during the encoding.

Herein, when the motion type of the macroblock is motionlessness or strictly true motion, and the intra-frame complexity of the macroblock is less than the fourth threshold, the fractional pixel motion estimation for the macroblock is disabled on the basis of disabling the intra-frame prediction for the macroblock. When the values obtained by performing the calculation and the motion type do not meet any one of the preceding conditions, no disabling processing is performed. If some work processes are disabled when a current macroblock is processed, and during processing characteristic information of a next macroblock, a result obtained by performing calculation and the characteristic information do not meet any one of the preceding conditions for disabling a part of work processes, a corresponding work process is automatically enabled.

A switch mode for enabling or disabling, according to the motion type of the macroblock, a part of work processes that are performed during the encoding is a self-adaptive switch mode.

Figure 3:
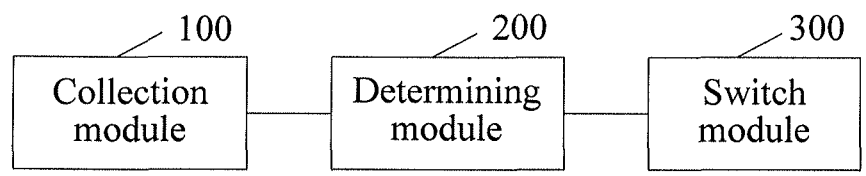
FIG. 3 is a schematic composition diagram of an embodiment of an encoding apparatus according to the present invention.

Refer to FIG. 3, which is a schematic composition diagram of an embodiment of an encoding apparatus according to the present invention. The encoding apparatus in this embodiment includes: a collection module 100, a determining module 200, and a switch module 300.

The collection module 100 is configured to collect characteristic information of a macroblock, where the characteristic information is generated during encoding, and includes a motion vector, inter-frame complexity, and intra-frame complexity of the macroblock that has undergone integer pixel motion estimation.

Specifically, the inter-frame complexity is the sum of absolute differences between the macroblock and a reference block at an optimum-matching position of a preceding frame, and the intra-frame complexity is the sum of absolute residuals between each pixel of the macroblock and an average of brightness values of the macroblock.

The determining module 200 is configured to determine a motion type of the macroblock according to the motion vector of the macroblock that has undergone the integer pixel motion estimation and motion vectors of adjacent blocks adjacent to the macroblock.

Specifically, the adjacent blocks include a left adjacent block, an upper adjacent block, an upper left adjacent block, and an upper right adjacent block.

The determining module 200 is further configured to:
calculate values of $\max(|mvx-mvx_n|)$ and $\max(|mvy-mvy_n|)$, where (mvx, mvy) is the motion vector of the macroblock that has undergone the integer pixel motion estimation, and $(mvx_n, mvy_n)$ is a motion vector of an adjacent block adjacent to the macroblock; determine whether motion vector values mvx and mvy of the macroblock both are equal to 0 and whether the inter-frame complexity of the macroblock is less than a first threshold, where if yes, it indicates that the motion type of the macroblock is motionlessness; determine whether the values of $\max(|mvx-mvx_n|)$ and $\max(|mvy-mvy_n|)$ are both less than a second threshold, where if yes, it indicates that the motion type of the macroblock is strictly true motion; and determine whether the values of $\max(|mvx-mvx_n|)$ and $\max(|mvy-mvy_n|)$ are both less than a third threshold, where if yes, the motion type of the macroblock is true motion, and the second threshold is less than the third threshold.

The switch module 300 is configured to enable or disable, according to the motion type of the macroblock, a part of work processes that are performed during the encoding.

The switch module 300 is further configured to:

determine whether the motion type of the macroblock is motionlessness or true motion, and if yes, disable intra-frame prediction for the macroblock; and determine whether the motion type of the macroblock is motionlessness or strictly true motion and whether the intra-frame complexity of the macroblock is less than a fourth threshold, and if yes, disable fractional pixel motion estimation for the macroblock on the basis of disabling the intra-frame prediction for the macroblock.

A switch mode of the switch module 300 is a self-adaptive switch mode. In this way, no manual operation is required and convenient use is achieved.

In this embodiment, the collection module 100 collects characteristic information of a macroblock, where the characteristic information is generated during encoding; then, the determining module 200 calculates and analyzes the characteristic information; and finally, the switch module 300 enables and disables, in self-adaptive mode according to a calculation result and the characteristic information, intra-frame prediction and fractional pixel motion estimation that are performed during the encoding. This may significantly reduce dynamic power consumption during video encoding on the premise that encoding compression efficiency is ensured.

Generally, in intra-frame prediction, macroblocks in scenarios, such as extremely strenuous motion and quick switching, account for about 20%-35%; those in a general scenario account for about 50%-60%, and those in a motionless scenario account for more than 95%; therefore, macroblocks for which the intra-frame prediction can be disabled account for about 11%-97%. In fractional pixel motion estimation, macroblocks in scenarios, such as extremely strenuous motion and quick switching, account for about 5%-15%; those in a general scenario account for about 30%-40%, and those in a motionless scenario account for more than 95%; therefore, macroblocks for which the fractional pixel motion estimation can be disabled account for about 5%-96%. Therefore, in a practical encoding procedure, a percentage of macroblocks for which the intra-frame prediction and the fractional pixel motion estimation can be disabled is relatively high. Using the encoding method and apparatus described in the embodiments of the present invention may significantly reduce dynamic power consumption during video encoding.

According to the description of the preceding embodiments, the present invention has the following advantages:

Dynamic power consumption during video encoding can be significantly reduced, on the premise that encoding compression efficiency is ensured, simply by calculating and analyzing characteristic information of a macroblock, where the characteristic information is generated during the encoding, and enabling or disabling, in self-adaptive mode according to a calculation result, intra-frame prediction and fractional pixel motion estimation that are performed during the encoding, thereby achieving an effect of green energy saving. A switch mode for enabling or disabling the intra-frame prediction and the fractional pixel motion estimation is a self-adaptive switch mode. In this way, no manual operation is required and convenient use is achieved.

Persons of ordinary skill in the art may understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a Read-Only Memory (Read-Only Memory, ROM), or a Random Access Memory (Random Access Memory, RAM).

The foregoing disclosed descriptions are merely exemplary embodiments of the present invention. However, the protection scope of the present invention is not limited thereto. Therefore, equivalent variations made according to the claims of the present invention shall fall within the protection scope of the present invention.

What is claimed is:

1. An encoding method, comprising:

collecting, by an encoder, characteristic information of a macroblock, wherein the characteristic information is generated during encoding and comprises a motion vector, inter-frame complexity, and intra-frame complexity of the macroblock that has undergone integer pixel motion estimation;

calculating, by the encoder, values of $\max(|mvx-mvx_n|)$ and $\max(|mvy-mvy_n|)$, wherein $(mvx, mvy)$ is the motion vector of the macroblock that has undergone the integer pixel motion estimation, and $(mvx_n, mvy_n)$ is a motion vector of an adjacent block adjacent to the macroblock;

determining, by the encoder, a motion type of the macroblock according to the calculated values, wherein the step of determining a motion type of the macroblock according to the motion vector of the macroblock that has undergone the integer pixel motion estimation and the motion vectors of the adjacent block adjacent to the macroblock comprises:

determining whether motion vector values mvx and mvy of the macroblock both are equal to 0 and whether the inter-frame complexity of the macroblock is less than a first threshold, wherein when the motion vector values mvx and mvy of the macroblock both are equal to 0 and the inter-frame complexity of the macroblock is less than a first threshold, the motion type of the macroblock is motionlessness;

determining whether the values of $\max(|mvx-mvx_n|)$ and $\max(|mvy-mvy_n|)$ are both less than a second threshold, wherein when the values of $\max(|mvx-mvx_n|)$ and $\max(|mvy-mvy_n|)$ are both less than a second threshold, the motion type of the macroblock is strictly true motion; and determining whether the values of $\max(|mvx-mvx_n|)$ and $\max(|mvy-mvy_n|)$ are both less than a third threshold, wherein when the values of $\max(|mvx-mvx_n|)$ and $\max(|mvy-mvy_n|)$ are both less than a third threshold, the motion type of the macroblock is true motion, and the second threshold is less than the third threshold; and enabling or disabling, by the encoder according to the motion type of the macroblock, a part of work processes that are performed during the encoding.

2. The encoding method according to claim 1, wherein the adjacent block comprises at least one of a left adjacent block, an upper adjacent block, an upper left adjacent block, and an upper right adjacent block.

3. The encoding method according to claim 1, wherein the motion type of the macroblock comprises motionlessness, true motion, and strictly true motion.

4. The encoding method according to claim 1, wherein the step of enabling or disabling, according to the motion type of the macroblock, a part of work processes that are performed during the encoding comprises:

determining whether the motion type of the macroblock is motionlessness or true motion; and when the motion type of the macroblock is motionlessness or true motion, disabling intra-frame prediction for the macroblock.

5. The encoding method according to claim 4, wherein the step of enabling or disabling, according to the motion type of the macroblock, a part of work processes that are performed during the encoding further comprises:

determining whether the motion type of the macroblock is motionlessness or strictly true motion and whether the intra-frame complexity of the macroblock is less than a fourth threshold; and when the motion type of the macroblock is motionlessness or strictly true motion and the intra-frame complexity of the macroblock is less than a fourth threshold, disabling fractional pixel motion estimation for the macroblock on the basis of disabling the intra-frame prediction for the macroblock.

6. The encoding method according to claim 1, wherein a switch mode for enabling or disabling, according to the motion type of the macroblock, a part of work processes that are performed during the encoding is a self-adaptive switch mode.

7. An encoding apparatus, comprising encoding circuitries configured to:

collect characteristic information of a macroblock, wherein the characteristic information is generated during encoding and comprises a motion vector, inter-frame complexity, and intra-frame complexity of the macroblock that has undergone integer pixel motion estimation;

calculate values of $\max(|mvx-mvx_n|)$ and $\max(|mvy-mvy_n|)$, wherein (mvx, mvy) is the motion vector of the macroblock that has undergone the integer pixel motion estimation, and $(mvx_n, mvy_n)$ is the motion vector of an adjacent block adjacent to the macroblock;

determine a motion type of the macroblock according to the calculated values, wherein the motion type determination further comprises:

determine whether motion vector values mvx and mvy of the macroblock both are equal to 0 and whether the inter-frame complexity of the macroblock is less than a first threshold, wherein when the motion vector values mvx and mvy of the macroblock both are equal to 0 and the inter-frame complexity of the macroblock is less than a first threshold, the motion type of the macroblock is motionlessness;

determine whether the values of $\max(|mvx-mvx_n|)$ and $\max(|mvy-mvy_n|)$ are both less than a second threshold, wherein when the values of $\max(|mvx-mvx_n|)$ and $\max(|mvy-mvy_n|)$ are both less than a second threshold, the motion type of the macroblock is strictly true motion; and determine whether the values of $\max(|mvx-mvx_n|)$ and $\max(|mvy-mvy_n|)$ are both less than a third threshold, wherein when the values of $\max(|mvx-mvx_n|)$ and $\max(|mvy-mvy_n|)$ are both less than a third threshold, the motion type of the macroblock is true motion, and the second threshold is less than the third threshold; and enable or disable, according to the motion type of the macroblock, a part of work processes that are performed during the encoding.

8. The encoding apparatus according to claim 7, wherein the adjacent block is at least of a left adjacent block, an upper adjacent block, an upper left adjacent block, and an upper right adjacent block.

9. The encoding apparatus according to claim 7, further configured to:

determine whether the motion type of the macroblock is motionlessness or true motion, and when the motion type of the macroblock is motionlessness or true motion, disable intra-frame prediction for the macroblock; and determine whether the motion type of the macroblock is motionlessness or strictly true motion and whether the intra-frame complexity of the macroblock is less than a fourth threshold, and when the motion type of the macroblock is motionlessness or strictly true motion and the intra-frame complexity of the macroblock is less than a fourth threshold, disable fractional pixel motion estimation for the macroblock on the basis of disabling the intra-frame prediction for the macroblock.

10. The encoding apparatus according to claim 7, further comprising a switch that includes a self-adaptive switch mode.

* * * * *